United States Patent [19]
Baldwin et al.

[11] Patent Number: 5,108,726
[45] Date of Patent: Apr. 28, 1992

[54] COMPACTS OF SPRAY DRIED WATER SOLUBLE COMPOUNDS

[75] Inventors: Roger A. Baldwin, Warr Acres; Virgil J. Barczak, Oklahoma City, both of Okla.

[73] Assignee: Kerr-McGee Chemical Corporation, Oklahoma City, Okla.

[21] Appl. No.: 233,767

[22] Filed: Aug. 19, 1988

[51] Int. Cl.$^5$ .............. C01B 35/12; C01D 3/22; C01D 5/00; C01D 7/38

[52] U.S. Cl. .................. 423/279; 23/313 R; 23/313 AS; 423/332; 423/421; 423/422; 423/499; 423/551; 423/553

[58] Field of Search .............. 423/332, 334, 279, 499, 423/553, 421, 422, 551; 23/313 R, 313 AS, 313 P, 313 FB, 293 A, 302 T, 303

[56] References Cited

U.S. PATENT DOCUMENTS

| 287,128 | 10/1883 | Hemje | 423/422 |
|---|---|---|---|
| 338,924 | 3/1886 | Carson et al. | 423/422 |
| 1,940,459 | 12/1933 | MacDonald | 423/421 |
| 2,998,310 | 1/1958 | O'Brien et al. | 71/2.2 |
| 3,835,216 | 9/1974 | Almagro et al. | 423/332 |
| 3,879,527 | 8/1975 | Bertorelli | 423/332 |
| 3,956,467 | 5/1976 | Bertorelli | 423/332 |
| 3,971,631 | 7/1976 | Almagro et al. | 423/334 |
| 3,989,472 | 11/1976 | Braithwaite et al. | 23/293 A |
| 4,320,105 | 3/1982 | Nelli et al. | 423/421 |
| 4,405,486 | 9/1983 | Eoga | 23/313 |
| 4,895,819 | 1/1990 | Drake | 423/421 |

FOREIGN PATENT DOCUMENTS

| 669388 | 8/1963 | Canada | 423/422 |
|---|---|---|---|
| 685217 | 4/1964 | Canada | 423/421 |
| 988315 | 5/1976 | Canada | 423/421 |
| 776331 | 6/1957 | United Kingdom | 423/421 |
| 1595769 | 8/1981 | United Kingdom | 423/421 |

OTHER PUBLICATIONS

Kirk-Othmer *Encyclopedia of Chemical Technology*, 3rd ed. vol. 17 p. 280.
Kirk-Othmer *Encyclopedia of Chemical Technology*, 3rd ed. vol. 21 pp. 89-93.
Perry *Chemical Engineers' Handbook*, 4th ed. pp. 8-6-2-8-64 and pp. 20-57-20-61.

*Primary Examiner*—Wayne Langel
*Attorney, Agent, or Firm*—Herbert M. Hanegan

[57] ABSTRACT

The present invention is directed to articles of manufacture comprising solid compacts, formed at elevated pressures, from homogenous, finely divided powders of spray dried water soluble inorganic compounds. The solid compacts are characterized by their readily water dissolvable, substantially nondusting and dense nature.

17 Claims, No Drawings

COMPACTS OF SPRAY DRIED WATER SOLUBLE COMPOUNDS

FIELD OF THE INVENTION

The present invention relates to articles of manufacture. Particularly, this invention relates to articles of manufacture comprising readily water dissolvable, substantially nondusting, dense solid compacts formed from homogenous finely divided powders of spray dried water soluble inorganic compounds.

BACKGROUND OF THE INVENTION

The use of size enlargement techniques to build up solid masses from small particulate materials such as catalysts, metal powders, fertilizers and various other small particulate materials is well-known. Such size enlargement techniques have included sintering, extrusion, briquetting, pelleting, nodulizing and granulating, to name but a few. While there exist numerous reasons for employing size enlargement techniques to build up solid masses from small particulate materials, some of the more significant reasons are to densify such materials for more convenient storage and shipment, to reduce dust nuisance, to prevent caking and lumping of the materials, to reduce dust losses during handling, and the like.

Although the advantages of size enlargement are numerous, the use of size enlargement to obtain these advantages is not without drawbacks. For example, it generally is agreed that in order to maintain or even enhance the rate of dissolution of certain materials such as water soluble, solid inorganic compounds, e.g., particulate borates and inorganic salts of the alkali metals, it is highly desirable that these solid inorganic compounds be relatively finely divided. Thus, when such compounds are subjected to size enlargement to increase their density or to reduce their tendency to dust, it has been found that the rate of dissolution of these compounds is significantly decreased.

The present invention provides for solid articles of manufacture prepared from finely divided powers of spray dried, water soluble compounds, but which solid articles retain the ready solubility of powdery compounds from which they are prepared.

SUMMARY OF THE INVENTION

The present invention relates to articles of manufacture comprising readily water dissolvable, substantially nondusting, dense solid compacts. Particularly, this invention relates to those solid compacts formed, at elevated pressures, from homogenous, finely divided powders of spray dried water soluble inorganic compounds. More particularly, the present invention relates to solid compacts prepared from finely divided powders of spray dried inorganic compounds selected from the group consisting of the inorganic salts and borates of alkali metals exhibiting solubilities in water of at least 1.5 parts per 100 parts of water as determined at 0° C. The solid compacts of this invention unexpectedly exhibit rates of dissolution in water at least equal to those of the finely divided, powdery spray dried inorganic compounds from which the solid compacts are prepared.

DETAILED DESCRIPTION OF THE INVENTION

As disclosed herein, the present invention is directed to articles of manufacture comprising readily water dissolvable, substantially nondusting, dense solid compacts. The compacts of this invention are prepared from homogenous, finely divided powders of spray dried water soluble inorganic compounds utilizing conventional size enlargement techniques.

Broadly, the readily water dissolvable solid compacts of this invention are formed from homogenous, finely divided powders of any inorganic compound having a solubility in water of at least 1.5 parts by weight per 100 parts by weight of water as determined at 0° C. and capable of being converted into said homogenous, finely divided powders by means of spray drying. In a more preferred embodiment, the water soluble inorganic compounds found to be particularly useful in preparing the readily water dissolvable solid compacts of this invention are those inorganic compounds selected from the group consisting of the borates and inorganic salts of the alkali metals of Group IA of the Periodic Table of Elements. Representative, but non-limiting, examples of useful borate compounds include sodium metaborate tetrahydrate, sodium tetraborate pentahydrate, sodium tetraborate decahydrate, sodium pentaborate pentahydrate, lithium pentaborate decahydrate, potassium tetraborate tetrahydrate, rubidium pentaborate octahydrate, cesium pentaborate octahydrate, and the like. Useful inorganic salts of alkali metals include, for example, sodium sulfate, lithium sulfate, potassium sulfate, sodium chloride, lithium chloride, sodium carbonate, potassium carbonate, sodium bicarbonate, lithium bicarbonate, cesium carbonate, and the like.

In a most preferred embodiment, the readily water dissolvable solid compacts of the present invention comprise those solid compacts formed from homogenous, finely divided powders of spray dried water soluble sodium borates. By way of illustration only, the following detailed description of the present invention is specifically directed to this more preferred embodiment.

In accordance with this most preferred embodiment, representative sodium borate compounds useful in preparing the readily water dissolvable solid compacts of the present invention will include, for example, those water soluble sodium borate compounds disclosed in U.S. Pat. No. 2,998,310, the teachings of which are incorporated herein by reference in their entirety. The water soluble sodium borate compounds disclosed and described in this patent generally comprise homogenous, finely divided powders of those sodium borate compounds containing sodium and boron oxides present in molar ratios of $Na_2O:B_2O_3$ ranging from about 0.15 to about 0.30 and water of hydration ranging from about 4 to about 10 moles and further exhibiting bulk densities ranging from about 0.4 to about 0.6 g/cc. From among the numerous sodium borate compositions described in U.S. Pat. No. 2,998,320, particularly useful composition are those wherein the molar ratio of $Na_2O:B_2O_3$ ranges from about 0.20 to about 0.25. Representative examples of such particularly useful compositions are sodium pentaborate pentahydrate and sodium octaborate tetrahydrate.

Further in accordance with the teachings of the above patent, the sodium borates disclosed therein readily can be prepared by first forming a water solution of a mixture of water soluable ingredients selected from the group consisting of granular sodium tetraborate pentahydrate, sodium pentaborate pentahydrate, sodium metaborate tetrahydrate and boric acid. These water soluble ingredients are combined in such proportions as to provide the molar ratio of Na2O:B2O3 desired in the final powdery sodium borate composition. In the special case of the sodium borate having the molar ratio of Na2O:B2O3 of 0.2 (i.e., sodium pentaborate), the water solution can contain a mixture of boric acid and sodium tetraborate in the appropriate molar proportions or can be prepared from sodium pentaborate alone. The water solution containing the boron containing ingredients, then is rapidly evaporated by spraying the water solution into a hot, relatively dry gas, e.g., air to yield a finely divided powder of the desired sodium borate composition.

Regardless of the particular water soluble inorganic compound employed to prepare the readily water dissolvable solid compacts of the present invention, it is critical that this inorganic compound be in the form of finely divided powders produced by spray drying. Spray drying, which is more fully described in Perry's *Chemical Engineers' Handbook*, 4th Ed. (1963), Section 20, pp 57-61, typically results in the production of powders comprised of thin-wall, hollow particles. Powders comprised of such thin-wall, hollow particles are easily broken, particularly when subjected to size enlargement to form the readily water dissolvable solid compacts of this invention. The breakage of these thin-wall, hollow particles, when subjected to size enlargement, leads to an increase in the surface area of the powder particles contained in the solid compacts. With respect to the ready dissolvable nature of the solid compacts of this invention, it is believed that it is this increased surface area that allows these solid compacts to dissolve in water at rates at least equivalent to the rates of dissolution of the finely divided powders from which said solid compacts are prepared.

The readily water dissolvable solid compacts of the present invention can be formed from the finely divided powders of spray dried water soluble inorganic compounds described above by any of the known techniques or processes employed to effect size enlargement of finely divided solid materials. Representative examples of such techniques or processes include, for example, compaction and extrusion. In such techniques or processes, direct pressure is employed to consolidate and densify the finely divided powders undergoing size enlargement. Typical equipment employed in carrying out the compaction or extrusion of finely divided powders include various types of hydraulically or mechanically operated compression molding presses such as tableting presses, paired roll briquetting presses and the like and various types of hydraulically or mechanically operated extrusion presses such as pellet mills. A more detailed description of typical compaction and extrusion equipment and the operation thereof is disclosed in Kirk-Othmer, *Encyclopedia of Chemical Technology*, Vol. 17, 3rd Ed (1982), page 280 and Vol. 21, pp 89-93. Further descriptions of such equipment and its operation also can be found in Perry's *Chemical Engineers' Handbook*, 4th Ed (1963), Section 8, pp 62-64.

In general, the pressures which can be employed to form the readily water dissolvable solid compacts of this invention can vary over a wide range. Broadly, operating pressures ranging from about 70 kg/cm$^2$ to about 5100 kg/cm$^2$ can be employed while pressures ranging from about 200 kg/cm$^2$ to about 650 kg/cm$^2$ are preferred. Utilizing the above broad range of operating pressure, the resulting readily water dissolvable solid compacts are characterized by possessing compressed densities ranging from about 1.0 g/cc to about 1.8 g/cc. When the preferred range of operating pressures are employed, readily water dissolvable solid compacts characterized by compressed densities ranging from about 1.2 g/cc to about 1.4 g/cc are obtained.

As disclosed previously, the single, most important characteristic of the solid compacts of this invention is their ready dissolubility in water. Typically, these solid compacts exhibit rates of dissolution in water at least equal to, and in many instances greater than, the rates of dissolution of the finely divided powders of the spray dried water soluble inorganic compounds from which they are prepared. Also, as disclosed previously, this characteristic is unexpected based on what was heretofore known as exemplified by the teachings in U.S. Pat. No. 2,998,310. Therein it is taught that, for ready water dissolubility it is highly desirable that a solid composition be relatively finely divided. Thus, the fact that the solid compacts of the present invention exhibit rates of dissolution in water at least equal to those of the powdery inorganic compounds from which they are prepared is truly surprising.

The following examples illustrate the present invention in more detail.

EXAMPLES 1-4

Four pellets, representative of the readily water dissolvable, substantially nondusting, dense solid compacts of the present invention, were produced from a homogenous, finely divided, dusty powder consisting essentially of sodium octaborate tetrahydrate having a bulk density of 0.48 g/cc and a molar ratio of Na2O:B2O3 of about 0.25. This powdery sodium octaborate tetrahydrate was prepared by spray drying an aqueous solution containing 35.4 weight percent of water, 25.4 weight percent (4 moles) of boric acid and 39.2 weight percent (1 mole) of sodium tetraborate decahydrate.

The pellets were prepared by compressing 1-gram quantities of the above powdery sodium octaborate tetraborate in a 15/16 inch diameter die using a Carver Model C laboratory press. Pressures ranging from about 70 to 5100 kg/cm$^2$ were employed to produce the finished pellets.

Each pellet then was tested for rate of dissolution by placing it in a beaker containing 200 mls. of deionized water maintained at a temperature of from about 23° C. to about 24° C. Agitation of the contents of the beaker was provided by means of a three blade propeller attached to the shaft of an overhead motor. The rate of dissolution of each pellet was determined by measuring the time from the moment the pellet was introduced into the water until, by visual observation, the pellet had completely dissolved. Various data relating to each of the four pellets as well as the powdery sodium octaborate tetrahydrate employed to prepare the pellets are set forth in Table I below.

TABLE I

| Example No. | Compaction Pressure kg/cm$^2$ | Compressed Density[a] kg/cm$^3$ | Rate of Dissolution Minutes |
|---|---|---|---|
| A[b] | NA[c] | 0.48[d] | 4.5[e] |
| 1 | 70.3 | 1.11 | 3.5 |

TABLE I-continued

| Example No. | Compaction Pressure kg/cm² | Compressed Density(a) kg/cm³ | Rate of Dissolution Minutes |
|---|---|---|---|
| 2 | 210.9 | 1.20 | 3.5 |
| 3 | 632.8 | 1.33 | 3.5 |
| 4 | 5062.1 | 1.76 | 3.5 |

(a)Calculated based on the weight of the pellet (1 gram) and the dimensions thereof.
(b)Powdery sodium octaborate tetrahydrate.
(c)NA - not applicable.
(d)Bulk density.
(e)Average of two tests.

From the above Table I, it readily is apparent that the pellets prepared from the spray dried powdery sodium octaborate tetrahydrate are characterized by rates of dissolution in water greater than those of the powdery sodium octaborate tetrahydrate itself. The fact that each of the pellets dissolved at a faster rate than the bulk powder from which they were produced is surprising and totally unexpected.

COMPARATIVE EXAMPLES 5-8

A series of four comparative test pellets were produced from a powder comprising a non-spray dried physical mixture of 4 moles of granular boric acid and 1 mole of granular tincalconite (sodium tetraborate pentahydrate). The molar ratio of $Na_2O:B_2O_3$ in this physical mixture was about 0.25. The pellets were produced in the same manner, using the same die and press as employed in Examples 1-4 immediately above. The rate of dissolution of these pellets also was determined utilizing the same equipment and procedure as employed for the previous examples. Data relating to each of these pellets are set forth in Table II below.

TABLE II

| Example No. | Compaction Pressure kg/cm² | Rate of Dissolution Minutes |
|---|---|---|
| B(a) | NA(b) | 2.0 |
| 5 | 70.3 | 7.0 |
| 6 | 210.9 | 7.0 |
| 7 | 632.8 | 6.5 |
| 8 | 5062.1 | 7.5 |

(a)Powdery physical mixture.
(b)NA - not applicable.

From the above Table II it readily is apparent that size enlargement (in these examples by way of compaction of the physical mixture) typically has a detrimental effect on the rate of dissolution of powdery compositions. This data confirms the disclosure in U.S. Pat. No. 2,998,310 to the effect that for ready solubility it is highly desirable that solid compositions be relatively finely divided and emphasizes the surprising and unexpected nature of the solubility characteristics possessed by the solid compacts of the present invention.

While the present invention has been described in respect to what at present is considered to be the preferred embodiments, it will be understood that changes and modifications can be made therein without departing from its true scope as defined in the appended claims.

We claim:

1. Articles of manufacture consisting of readily water dissolvable, substantially non dusting, solid compacts, said compacts being formed, by compaction or extrusion, at elevated pressures without introduction of moisture and without undergoing any further processing steps, from finely divided dry powders of spray dried water soluble alkali metal compounds selected from the group consisting of alkali metal borates, alkali metal halides, alkali metal sulfates, alkali metal carbonates and alkali metal bicarbonates wherein said alkali metal compounds have solubilities in water of at least 1.5 parts per 100 parts of water measured at 0° C. and wherein said solid compacts exhibit rates of dissolution in water at least equal to the rates of dissolution of the powdery alkali metal compounds from which said solid compacts are formed.

2. The solid compacts of claim 1 wherein said solid compacts are formed at elevated pressures ranging from about 70 kg/cm² to about 5100 kg/cm².

3. The solid compacts of claim 1 wherein said solid compacts are formed from homogenous, finely divided powders of spray dried water soluble alkali metal borates.

4. The solid compacts of claim 3 wherein said powdery alkali metal borates comprise sodium borates consisting essentially of sodium and boron oxides present in mole ratios of $Na_2O:B_2O_3$ of from about 0.15 to about 0.30 and containing from about 4 to about 10 moles of water of hydration.

5. The solid compacts of claim 4 wherein said powdery sodium borates consist essentially of sodium and boron oxides present in mole ratios of from about 0.20 to about 0.25.

6. The solid compacts of claim 4 wherein said powdery sodium borates further are characterized by exhibiting bulk densities ranging from about 0.4 g/cc to about 0.6 g/cc.

7. The solid compacts of claim 5 wherein said powdery sodium borates comprise sodium pentaborate pentahydrate and sodium octaborate tetrahydrate.

8. The solid compacts of claim 1 wherein said solid compacts are formed at elevated pressures ranging from about 200 kg/cm² to about 650 kg/cm².

9. The solid compacts of claim 1 wherein said solid compacts are characterized by compressed densities ranging from about 1.2 g/cc to about 1.4 g/cc.

10. The solid compacts of claim 1 wherein said solid compacts exhibit rates of dissolution in water greater than the rates of dissolution of the powdery alkali metal compounds from which said solid compacts are formed.

11. Articles of manufacture comprising readily water dissolvable, substantially nondusting, dense, solid compacts formed, at elevated pressure ranging from about 70 kg/cm² to about 5100 kg/cm², from homogenous, finely divided powders of spray dried water soluble sodium borates consisting essentially of sodium and boron oxides present in a mole ratio of $Na_2O:B_2O_3$ of from about 0.15 to about 0.30 and containing from about 4 to about 10 moles of water of hydration, said solid compacts being characterized by compressed densities ranging from about 1.1 g/cc to about 1.8 g/cc and a rate of dissolution in water at least equal to the rate of dissolution in water of the powdery sodium borate.

12. The solid compacts of claim 11 wherein said solid compacts are formed at elevated pressures ranging from about 200 kg/cm² to about 635 kg/cm².

13. The solid compacts of claim 12 wherein said solid compacts are characterized by compressed densities ranging from about 1.20 g/cc to about 1.33 g/cc.

14. The solid compacts of claim 11 wherein said solid compacts are formed from homogenous, finely divided powders of spray dried water soluble sodium borates consisting essentially of sodium and boron oxides present in a mole ratio of $Na_2O:B_2O_3$ of from about 0.20 to about 0.25, said powdery sodium borates having bulk densities ranging from about 0.40 g/cc to about 0.60 g/cc.

15. The solid compacts of claim 14 wherein said powdery sodium borates comprise sodium pentaborate pentahydrate and sodium octaborate tetrahydrate.

16. A method for producing a readily water dissolvable, substantially non-dusting, solid compact comprising:
   (1) providing finely divided dry powders of spray dried water soluble alkali metal compounds selected from the group consisting of alkali metal borates, alkali metal halides, alkali metal sulfates, alkali metal carbonates and alkali metal bicarbonates wherein said alkali metal compounds have solubilities in water of at least 1.5 parts per 100 parts of water measured at 0° C.;
   (2) applying elevated pressures without introduction of moisture to said finely divided powders to form a solid compact wherein said solid compact exhibits a rate of dissolution in water at least equal to the rate of dissolution of the powdery alkali metal compound from which the solid compact is formed.

17. The method of claim 16 wherein said elevated pressure is provided by a compaction or extrusion process.

* * * * *